Oct. 31, 1961     R. L. BURK ET AL     3,006,093
ROTATING DEVICE FOR MECHANICAL SIGNS

Filed March 2, 1959     2 Sheets-Sheet 1

ROBERT L. BURK
FRANK HEDGE
INVENTORS.

BY *Beehler & Shanahan*

ATTORNEYS.

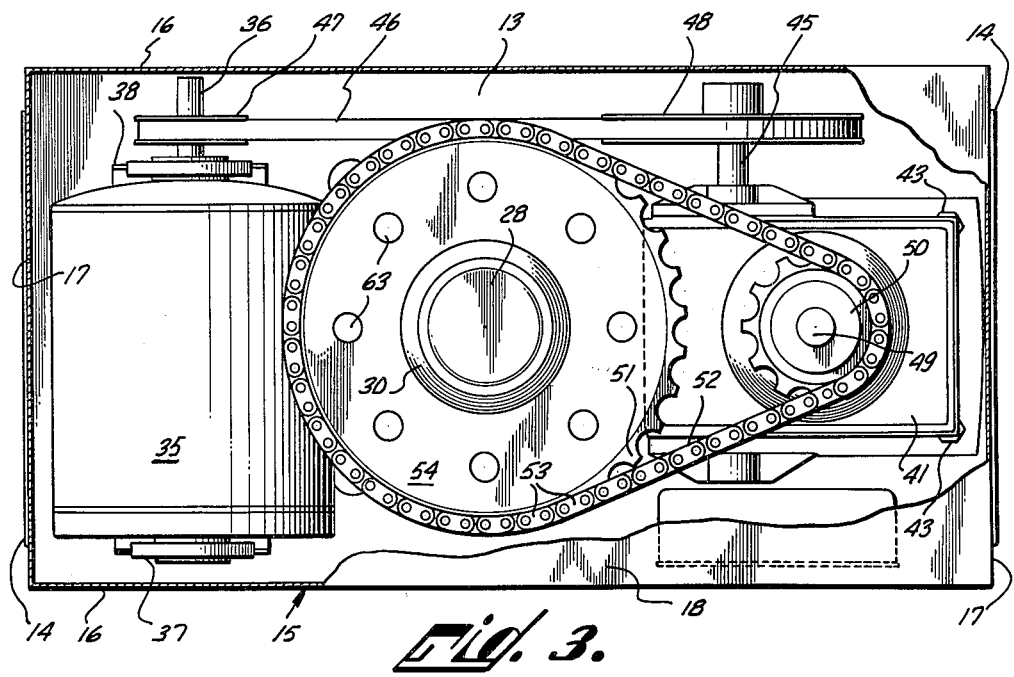
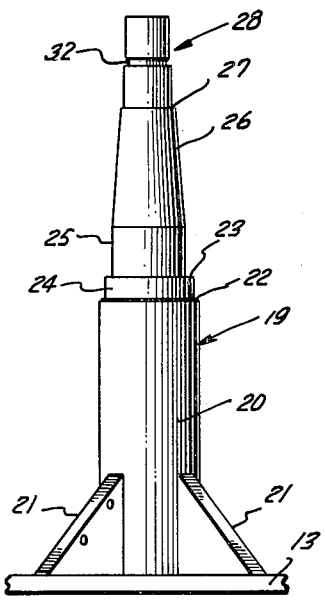
ROBERT L. BURK
FRANK HEDGE
INVENTORS.

United States Patent Office 3,006,093
Patented Oct. 31, 1961

3,006,093
ROTATING DEVICE FOR MECHANICAL SIGNS
Robert L. Burk, 417 Lucerne Blvd., Los Angeles 5, Calif., and Frank Hedge, 12311 Clover Ave., Los Angeles 66, Calif.
Filed Mar. 2, 1959, Ser. No. 796,697
2 Claims. (Cl. 40—33)

The invention relates to rotatable mounts which are especially adapted for supporting and rotating large signs. The invention has special reference to a power mechanism which is employed to cause a post carrying a sign of considerable weight to be rotated continuously for long periods of time and under circumstances where virtually no servicing need be required.

Sundry expedients have long been employed for mechanical signs with resort being had to motors, gears, sundry drives, and movable mechanisms intended in the main to provide signs with some extraordinary movable characteristics. Large signs weighing many pounds and even many hundreds of pounds on some occasions, when designed for movement, have necessitated virtually a custom constructed base and platform adapted to a particular sign and location. The mechanical means heretofore employed have not been unitary and consequently, in cases of large and heavy signs especially, have needed considerable engineering and mechanical skill to install in a fashion assuring proper and continued operation for any appreciable length of time.

Another drawback to the custom type installation has been the burdensome servicing problem which has called for skilled workmen making inspection and servicing trips to the sign location equipped with all manner of spare and replacement parts as well as necessary tools to do the servicing job on the spot.

The result of installations of the kind made reference to has been a very high cost which has prohibited the use of movable signs in many advantageous locations.

It is therefore among the objects of the invention to provide a new and improved sign mount of a compact unitary construction such that the entire movable mechanism is self-contained and can be installed as a unit at the desired location without need for special mechanical skill.

Another object of the invention is to provide a new and improved rotatable mount for movable signs of appreciable weight which can be adjusted as a unit upon sign posts already present on the premises, the mount being of such character that those signs which have previously been of a stationary nature can be installed upon the rotatable mount and thereby caused to rotate as a movable sign would rotate.

Still another object of the invention is to provide a rotatable mount for signs of unitary construction and moreover including as a rotatable element a packed and sealed hub of such rugged construction that it can be depended upon to continue rotation unserviced under severe conditions for many years of continuous operation.

Still another object of the invention is to provide a new and improved rotatable sign mount of unitary construction such that all movable parts can be assembled and tested with respect to proper rotation at the source and installed as a unit in such fashion that should it be necessary to remove the rotatable mount for any reason such as replacement at a different location or for possible servicing, the entire unit can be removed without dismantling in any way and transported as a unit.

Still further among the objects of the invention is to provide a new and improved unitary rotatable mount which includes in addition to a power unit a gear reduction unit and all-purpose rotatable hub together with accessory equipment for sundry electrical needs, all parts of which are embodied as a unit in the device prior to installation.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 3 is a plan view of the rotatable mount of FIGURE 1 showing the cover or casing broken away to reveal the interior.

FIGURE 4 is a side elevational view of the spindle which forms the central sign post supporting member in the rotatable sign.

Figure 1:
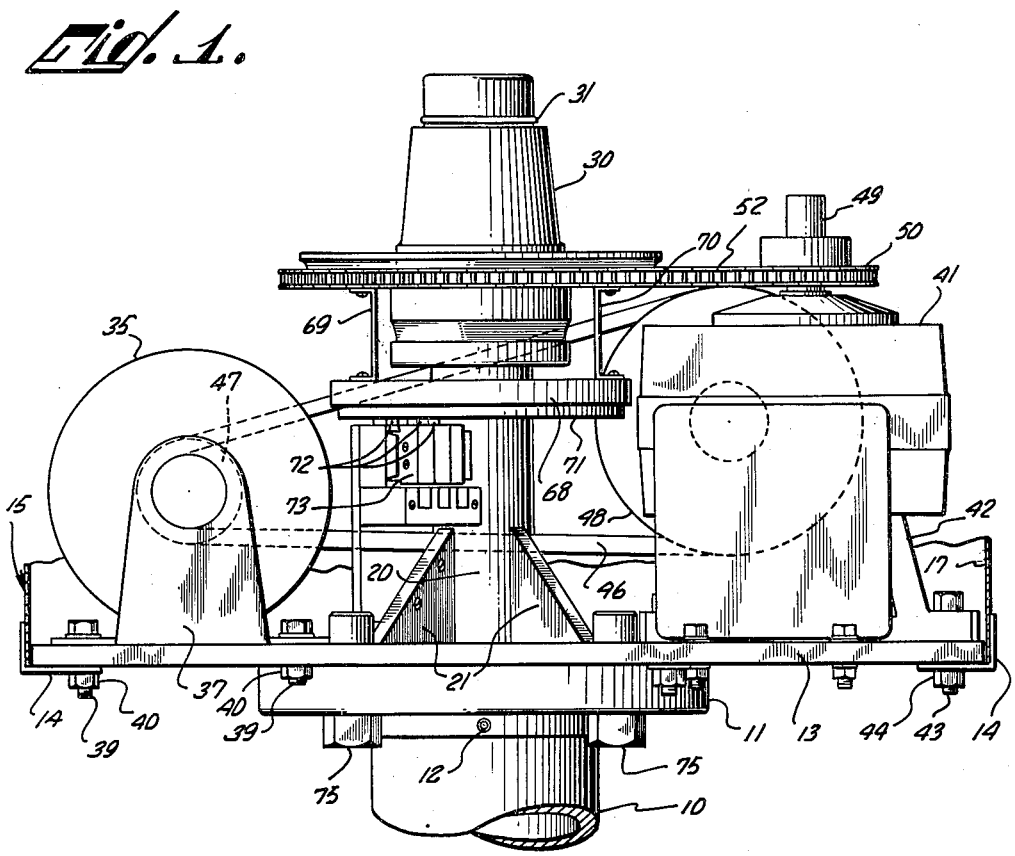
FIGURE 1 is a side elevational view of the rotatable mount with the cover or casing thereof removed in order to enable ready examination of the interior operating portions.

In the embodiment of the invention chosen for the purpose of illustration a post or pedestal 10 is pictured as a vertical member which customarily is a pedestal which may be already mounted upon the premises. On the upper portion of the pedestal is a flange 11 which may be threaded upon the pedestal in a conventional fashion and anchored in place by means of a rivet or set screw 12. The pedestal in question may be as large as four inch iron pipe size or on some occasions larger.

Mounted upon the flange and pedestal is a plate or platform 13 around the edges of which are angle sections 14 employed to retain a weather-proof cover indicated generally by the reference character 15. The cover includes side walls 16, end walls 17, and a top wall 18.

Anchored to the platform 13 and essentially within the cover 15 is a spindle member indicated generally by the reference character 19 and shown in detail in FIGURE 4. The spindle is preferably solid and of an alloy suited to the making of axles such as are used on automotive vehicles. The spindle member includes a lower cylindrical element 20 at the base of which are bracket plates 21 which serve to anchor the spindle in vertical poisition with respect to the platform 13. At the top of the cylindrical element are shoulders 22 and 23 separated by a collar 24 and above the shoulder 23 is a wider collar 25. Immediately above the wider collar is a tapered element 26 terminating in a shoulder 27 above which is a composite cylindrical section 28. These last indentified portions of the spindle correspond in general to the portions of an automotive axle upon which wheel hubs are regularly mounted.

A hub 30 illustrated in FIGURE 1 and also visible in FIGURE 3 is adapted to be mounted upon the upper portion of the spindle wherein it is held upon shoulders 24 and 27. Although interior details of the hub are not shown, attention is directed to the fact that the hub conforms to conventional automotive hubs in that it contains the customary roller bearings and packing seals, both inside and outside, so that the hub can be pressure packed with grease and the grease retained in the hub by the conventional seals. In the present instance the hub is retained upon the spindle by employment of a snap ring 31 seating in a groove 32.

Figure 2:
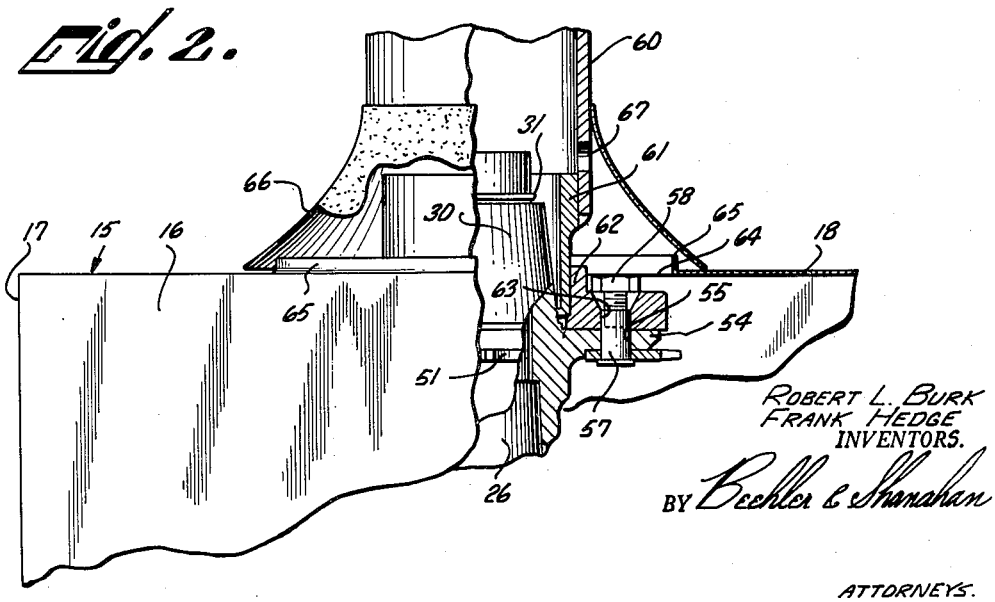
FIGURE 2 is a partial side elevational view shown partially in longitudinal section illustrating that portion of the rotatable mount to which a sign post is attached.

An electric motor 35 is shown mounted upon the platform to the left of the spindle, as shown in FIGURES 1 and 2. The motor is mounted with the motor drive shaft 36 in horizontal position, brackets 37 and 38 being employed to support the motor, the brackets being attached to the platform as shown by means of bolts 39 and nuts 40.

Secured to the platform on the opposite side of the spindle is a gear box 41 containing suitable reduction gears in order to reduce the speed of rotation of the motor 35 to some usable rate. Brackets 42 which carry the gear box are also shown anchored to the platform by means of bolts 43 and nuts 44. The gear box is so mounted that an input shaft 45 is horizontal and parallel to the drive shaft 36 of the motor. Consequently a belt, which is preferably a V-belt 46, by passing over a pulley 47 on the drive shaft and a pulley 48 on the driven shaft, makes it possible to rotate the input shaft 45 by operation of the motor 35.

The gear box is of such construction that an output shaft 49 extends vertically, as shown in FIGURES 1 and 2, above the top of the gear box where it is provided with a drive sprocket 50.

Surrounding and forming part of the hub 30 is a driven sprocket 51 of appreciably larger diameter than the drive sprocket 50. A chain drive 52 interconnects the sprockets, there being provided releasable links 53 by means of which the chain drive can be mounted in proper position around the sprockets.

Of significance is the provision of an annular flange 54 which is integral with the hub 30 and provided with a series of holes 55 matching holes 56 in the sprocket so that the sprocket may be attached to the flange by means of sleeves 57 in engagement with machine screws 58.

It is of special interest to note that a sign post 60 which is the post intended for support of a suitable sign (not shown) is provided at its lower end with a sleeve 61 preferably welded thereto, the sleeve extending downwardly within a flange 62 and suitably anchored within the flange either by threading, welding, or appropriate conventional connection. The flange 62 extends outwardly to a position overlying the flange 54 and is provided with matching holes 63 so that the flange 62 can be attached if need be to the flange 54 by the same sleeves 57 and screws 58 as are used to attach the sprocket to the flange.

It will be noted that a large opening 64 is formed in the top 18 of the cover 15, the opening being surrounded by an annular lip 65, the lip serving to prevent water, dust and the like from finding its way through the opening 64 into the interior of the cover.

To further protect the interior of the cover from ingress of moisture, a weather shield 66 of generally annular shape is applied over the base of the post 60 and flares outwardly over the lip 65 to a point of engagement with the upper surface of the top 18 of the cover. A hole 67 may be provided at the base of the post 60 to permit the accumulation of water within the post.

It will be understood that the post 60, the sleeve 61, and flange 62 are not normally a part of the unitary rotatable mount and preferably form a portion of the sign to be rotatably supported thereby. The post, therefore, with the aid of the sleeve and flange can be attached to the flange 54 after the rotatable mount is suitably mounted upon the pedestal 10 or, if convenience dictates, immediately prior thereto.

Suspended below the hub 30 and the sprocket 51 is an annular multiple contact ring 68. The ring is supported by brackets 69 and 70, as illustrated in FIGURE 1, in a position such that a lower side 71 of the ring may carry a plurality of annular electrical contacts (not shown) in a proper position for engagement with corresponding elements 72 of a terminal box 73. Inasmuch as the elements 72 herein referred to are substantially conventional for uses of the kind herein described, details are not shown.

When initially constructed, the motor 35, the gear box 41, and the hub 30 are all anchored in the position described within the confines of the cover 15. The motor and gear box as noted are fastened to the platform 13 and the hub rotatably mounted upon the spindle. Also as noted the spindle is fastened to the platform preferably by welding so that the axis of rotation of the spindle and hub is in alignment with the center line of the pedestal 10 and flange 11. The belt and the chain are likewise connected in the manner already described and the entire contents of the unit are placed in operating condition so that whenever the motor 35 is connected into a suitable motor circuit, the hub 30 will be rotated at a speed determined by the gear ratio of gears within the gear box 41. At the same time the contact ring 68 with its appropriate contact elements will be in operating relationship with respect to the terminal box 73. Accordingly, therefore, all parts are in fact mounted upon the platform and within the cover as a completely operating unit.

When this unit is to be installed at a suitable location, the platform is mounted upon the flange 11 on the pedestal 10 by employment of bolts 75, there being provided properly sized and spaced openings, respectively, in the platform and the flange for reception of the bolts. The cover, of course, can be readily lifted from its position during this portion of the installation. Once installed the sign post 60 with its sign attached is lowered into position surrounding the upper portion of the hub 30 and the flange 62 of the sign post bolted fast to the flange 54 of the hub. Having attached thereafter the weather shield 66, the device is ready for operation.

It will readily be understood that because of the fact that the operating parts are well housed within the cover and attached to a heavy-duty pressure packed hub 30, the device serves as an operative unit of particularly rugged character. The attachments are likewise rugged and simple so that once the sign post is mounted, it is ready for continued operation for long periods of time.

Whenever it might be necessary for any reason whatsoever to dismantle the sign, the post can be removed first by loosening the sleeves 57 and screws 58, whereafter subsequent to removal of the cover temporarily and the bolts 75, the entire operating portion of the device can be lifted as a unit from the top of the pedestal 10. On those occasions where some minor servicing in the field might be necessary, the cover 15 can readily be lifted from the platform and the arrangement of all moving parts is such that everything is readily accessible to the service man. Should there, however, be a major overhauling necessary after long periods of use, the entire unit after removal can be sent intact to a central agency and replaced entirely upon the pedestal by another like unit without occasioning any interruption in the service given by the rotatable mount.

From the foregoing description it will be understood that a very simple and rugged rotatable mount has been provided with heavy parts properly and effectively balanced upon a platform so that the entire unit can be mounted high upon a pedestal and there placed in continued operation without ready prospect of a break-down for as long as sign operation might be needed.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having thus described our invention, what we claim as new and desire to secure by Letters Patent is:

1. Apparatus for rotating a sign comprising a platform adapted to be fixed upon a pedestal and to extend horizontally, a spindle mounted on and extending upwardly from the center of the platform, the outside surface of the spindle being formed of a plurality of axially aligned sections comprising a base section, a cylindrical collar section of smaller diameter than the base section and defining an upwardly facing annular bearing shoulder between the base and the collar sections, a frusto-conical section extending upwardly from the collar section and having an upper end of smaller diameter than the lower end of the frusto-conical section, the diameter of the collar section being not less than the diameter of the lower end of the frusto-conical section, and an upper-end cylindrical section of smaller diameter than the upper end of the frusto-conical section and defining an upwardly facing annular bearing shoulder between the upper-end and the frusto-conical sections, the upper end section having a circumferentially extending annular groove formed in the cylindrical surface thereof intermediate the ends of the upper section, a hub rotatable on the spindle and having inside annular bearing shoulders in engagement with said bearing shoulders respectively of the spindle for rotatably supporting the hub on the spindle, a snap ring extending in said spindle groove and engageable against the hub for releasably holding the hub down on the spindle, the hub having an annular flange coaxial with the spindle, a power unit on the platform and drivingly connected to said flange for rotating the hub on the spindle, a sign support comprising a hollow post surrounding the top of the spindle, an annular flange on said post, and fasteners for releasably securing said post flange on said hub flange whereby rotation of the hub will cause rotation of the sign support.

2. A rotating sign mount comprising a pedestal, a platform fixed upon the pedestal and including a weather box, a vertical spindle extending upwardly through said box and centerably mounted on the platform in axial alignment with the pedestal, said spindle having a tapered upper portion and annular bearing shoulders defining the ends respectively of said tapered portion, and a hub rotatably mounted on the tapered upper portion of the spindle and adapted to be lifted off from the upper end of the spindle and having bearing means pressure packed and sealed within the hub, said hub having an upward facing annular flat face, a power unit for rotating the hub comprising a motor in said box mounted on the platform on one side of said spindle, a gear box mounted on the platform on the other side of the spindle in balanced relation with said motor, input shaft on said gear box and a belt drive from said motor to said input shaft offset relative to said spindle, a vertical output shaft at the upper part of said gear box, a driven sprocket on said hub intermediate outer and inner ends thereof, a drive sprocket on said output shaft and a drive chain from said drive sprocket to said driven sprocket adapted to effect rotation of said hub in response to rotation of said motor, a sign support comprising a hollow post surrounding the top of said spindle, a flange on the post having an annular horizontal face and means releasably securing said flange to said driven sprocket with the face of the flange supported on the face of the hub whereby to effect rotation of said post in response to rotation of the hub, a multiple contact ring surrounding said spindle and carried by said sprocket and a contact box on the platform having elements thereof in engagement with said ring, and a weather shield on the top of said box surrounding said post whereby to protect the interior of said box.

References Cited in the file of this patent

UNITED STATES PATENTS

| | | |
|---|---|---|
| 1,655,524 | Flague | Jan. 10, 1928 |
| 2,022,105 | Coons | Nov. 26, 1935 |
| 2,556,472 | Gray | June 12, 1951 |